(12) United States Patent
Keim et al.

(10) Patent No.: US 7,174,545 B2
(45) Date of Patent: *Feb. 6, 2007

(54) APPARATUS AND METHOD FOR PRODUCING DISPLAY APPLICATION SOFTWARE FOR EMBEDDED SYSTEMS

(75) Inventors: Dale O. Keim, Torrance, CA (US); Shahram Rahmani, Irvine, CA (US)

(73) Assignee: The Boeing Company, Chicago, IL (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/408,275

(22) Filed: Apr. 8, 2003

(65) Prior Publication Data
US 2004/0205713 A1 Oct. 14, 2004

(51) Int. Cl.
*G06F 9/45* (2006.01)
(52) U.S. Cl. .................................................. 717/148
(58) Field of Classification Search ........ 717/104–109, 717/114–118, 136–148; 715/762; 719/328
See application file for complete search history.

(56) References Cited

U.S. PATENT DOCUMENTS

| | | | | |
|---|---|---|---|---|
| 5,842,020 A | * | 11/1998 | Faustini ...................... | 395/701 |
| 6,289,506 B1 | * | 9/2001 | Kwong et al. ................. | 717/9 |
| 6,675,371 B1 | * | 1/2004 | York et al. ................... | 717/114 |
| 2003/0126590 A1 | * | 7/2003 | Burrows et al. ............. | 717/131 |

OTHER PUBLICATIONS

Sun Microsystems, The Java Virtual Machine Specification, 1999, Sun Microsystems, Inc., http://web.archive.org/web/19990508124421/http://java.sun.com/docs/books/vmspec/2nd-edition/html/VMSpecTOC.doc.html.*
Emacs, "17.Byte Compilation", Feb. 21, 2002, pp. 1-12, <http://web.archive.org/web/20020221091424/http://www.zvon.org/other/elisp/Output/SEC198.html>.*

* cited by examiner

*Primary Examiner*—Kakali Chaki
*Assistant Examiner*—Tuan A. Vu
(74) *Attorney, Agent, or Firm*—Lee & Hayes, PLLC (57) ABSTRACT

Methods and systems consistent with the present invention include, in one embodiment, producing display application software for embedded systems, the architecture of which partitions the display application software into two separate components: a) a Bytecode, which is an organized collection of static and dynamic data elements that define the components and attributes of the display application function within the given system utilizing a User Interface Tool; and b) a Display Virtual Engine which manipulates the information provided by the display data objects of the Bytecode. In particular, the Virtual Engine is a software entity that is executed within an embedded system, and which interprets the Bytecode according to a predefined instruction set. The same Virtual Engine is reusable within several embedded systems that have display components.

70 Claims, 2 Drawing Sheets

APPARATUS AND METHOD FOR PRODUCING DISPLAY APPLICATION SOFTWARE FOR EMBEDDED SYSTEMS

The present invention relates generally to an apparatus and method for producing display application software for embedded systems.

BACKGROUND OF THE INVENTION

Every year, billions of dollars are spent under government and commercial projects to develop application software for embedded systems, including those used for transportation systems, defense systems, communication systems, automation systems, control systems, "smart" systems, etc. In most cases, the display application software (that is, the code) is developed and generated from scratch. Other advanced methods for producing display application software that are currently used in the industry, include automatic code (auto-code) generation of the display application software code (from a specification).

The re-use of this display application software is only considered cost-effective if the new, embedded system is very similar to the previously developed system (such as the display part of the flight management application software used in airplanes). Even in such cases, many "re-use" attempts fail to be cost effective due to hidden dependencies and unique attributes that make such display application software products incompatible.

Thus, an innovative solution for "display applications" that can be used within embedded software systems is required.

SUMMARY OF THE INVENTION

In one aspect consistent with the methods and systems of the present invention, there is provided a method of creating a display application, including: receiving a set of user-defined display data objects and attributes of the display data objects; formatting the display data objects into a Bytecode that defines components and attributes of the display application; providing the Bytecode to a Virtual Engine; and generating an output that represents information, functionality and behavior of the display application provided in the Bytecode.

In yet another aspect consistent with the present invention, there is provided a method of creating a display application, including: receiving a set of user-defined display data objects and attributes specific to the display application created using a user interface tool; transforming the user-defined display data objects into a Bytecode that provides information needed by a Virtual Engine to produce functionality and products intended for the display application; storing static data of the Bytecode in a Static Object Buffer and making it available to an Output Manager; managing multiple sets of dynamic data of the Bytecode in a Handle Table which includes information about where each dynamic data set is stored and a list of actual output data; storing dynamic data in a Dynamic Update Buffer to prevent one of incorrect usage and access of the dynamic data while the dynamic data is still being updated in the Handle Table; interpreting the dynamic data and updating the Dynamic Update Buffer with the interpreted data; and generating output from the Dynamic Update Buffer to the Output Manager that represents information provided in the Bytecode.

In yet another aspect consistent with the present invention, there is provided a system for creating a display application, including: means for receiving a set of user-defined display data objects and attributes of the display data objects specific to the display application; means for formatting the display data objects into a Bytecode that defines components and attributes of the display application; means for providing the Bytecode to a Virtual Engine; and means for generating an output that represents information, functionality and behavior of the display application provided in the Bytecode.

In yet another aspect consistent with the present invention, there is provided a system for creating a display application, including: means for receiving a set of user-defined display data objects and attributes specific to the display application created using a user interface tool; means for transforming the user-defined display data objects into a Bytecode that provides functionality and products intended for the display application needed by a Virtual Engine to produce the display application; means for storing static data of the Bytecode in a Static Object Buffer and making it available to an Output Manager; means for managing multiple sets of dynamic data of the Bytecode in a Handle Table which includes information about where each dynamic data set is stored and a list of actual output data; means for storing dynamic data in a Dynamic Update Buffer to prevent one of incorrect usage and access of the dynamic data while the dynamic data is still being updated in the Handle Table; means for interpreting the dynamic data and updating the Dynamic Update Buffer with the interpreted data; and means for generating output to the Output Manager from the Dynamic Update Buffer, that represents information provided in the Bytecode.

In yet another aspect consistent with the present invention, there is provided an apparatus for creating a display application, including: a user interface tool which creates display data objects and attributes of the display data objects specific to the display application; an object compiler which formats the display data objects and the attributes into a Bytecode; and a Virtual Engine which interprets the Bytecode to produce a predetermined functionality and products intended for the display application.

In yet another aspect consistent with the present invention, there is provided an article of manufacture including: a computer usable medium having a computer readable program code embodied therein configured to create a display application, including: a computer readable program code configured to cause a computer to receive a set of user-defined display data objects and attributes of the display data objects specific to the display application; format the display data objects into a Bytecode that defines components and attributes of the display application; provide the Bytecode to a Virtual Engine; and generate an output that represents information, functionality, and behavior of the display application provided in the Bytecode.

In yet another aspect consistent with the present invention, there is provided an article of manufacture including: a computer usable medium having a computer readable program code embodied therein configured to create a display application, including: a computer readable program code configured to cause a computer to receive a set of user-defined display data objects and attributes specific to the display application created using a user interface tool; transform the user-defined display data objects into a Bytecode that provides information needed by a Virtual Engine to produce a predetermined functionality and products intended for the display application; store static data of the Bytecode in a Static Object Buffer and make it available to an Output Manager; manage multiple sets of dynamic data of the Bytecode in a Handle Table which includes information about where each dynamic data set is stored and a list of actual output data; store dynamic data in a Dynamic Update Buffer to prevent one of incorrect usage and access of the dynamic data while the dynamic data is still being updated in the Handle Table; interpret the dynamic data and updating the Dynamic Update Buffer with the interpreted data; and generate output to the Output Manager from the Dynamic Update Buffer that represents information provided in the Bytecode.

In yet another aspect consistent with the present invention, there is provided a computer-readable medium having contents that cause a computer system to create a display application, the computer system having a program that performs the steps of: receiving a set of user-defined display data objects and attributes of the display data objects specific to the display application; formatting the display data objects into a Bytecode that defines components and attributes of the display application; providing the Bytecode to a Virtual Engine; and generating an output that represents information, functionality and products of the display application provided in the Bytecode.

In yet another aspect consistent with the present invention, there is provided a computer-readable medium having contents that cause a computer system to create a display application, the computer system having a program that performs the steps of: receiving a set of user-defined display data objects and attributes specific to the display application created using a user interface tool; transforming the user-defined display data objects into a Bytecode that provides information needed by a Virtual Engine to produce a predetermined functionality and products intended for the display application; storing static data of the Bytecode in a Static Object Buffer and making it available to an Output Manager; managing multiple sets of dynamic data of the Bytecode in a Handle Table which includes information about where each dynamic data set is stored and a list of actual output data; storing dynamic data in a Dynamic Update Buffer to prevent one of incorrect usage and access of the dynamic data while the dynamic data is still being updated in the Handle Table; interpreting the dynamic data and updating the Dynamic Update Buffer with the interpreted data; and generating output to the Output Manager from the Dynamic Update Buffer that represents information provided in the Bytecode.

In a final aspect of the present invention, there is provided a computer system for creating a display application, the computer system including: a memory including: at least one program for receiving a set of user-defined display data objects and attributes of the display data objects specific to the display application; formatting the display data objects into a Bytecode that defines components and attributes of the display application; providing the Bytecode to a Virtual Engine; and generating an output that represents information, functionality and products of the display application provided in the Bytecode; and a processor for running the program.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for designing other structures, methods and systems for carrying out the several purposes of the present invention. It is important, therefore, that the claims be regarded as including such equivalent constructions insofar as they do not depart from the spirit and scope of the methods and apparatuses consistent with the present invention.

DETAILED DESCRIPTION OF THE INVENTION

Methods and systems consistent with the present invention include, in one embodiment, producing display application software for embedded systems. In particular, methods and systems consistent with the present invention include a display application technology architecture which partitions the display application software into two major separate components:

a) a Bytecode (data), which is an organized collection of static and dynamic data elements that defines the components and attributes of the display application function within the given system. The Bytecode is generated from a set of display data objects (non-code) which define the specific characteristics of the display, by a system user or designer utilizing a user-friendly tool called the User Interface Tool 100. The system user or designer can define, design, test, and validate the system using the User Interface Tool 100.

b) an entity, called the Display Virtual Engine (VE) 102 (code) or Virtual Machine (VM), the VE 102 which manipulates (interprets) the information provided by the display data objects of the Bytecode. In particular, in one embodiment, the VE 102 is a software entity executed within an embedded system that interprets the Bytecode according to a predefined instruction set.

Methods and systems consistent with the present invention include the feature that the same VE 102 can be used (and reused) within several embedded systems that have display components (e.g., cars, ships, and airplanes all have display systems for their operators and all can use the same Display VE 102).

Thus, the methods and systems consistent with the present invention minimize the need for software programming, allowing a system user or designer to define the display data objects for the user's unique system, integrate them with the reusable VE 102, and generate the customized display application software. In one embodiment, the User Interface Tool 100 runs on commercial data processing systems such as personal computers (PCs) 101 and provides a convenient way of providing access to the capabilities of the VE 102.

Once the VE 102 consistent with the present invention is in place, software production for the display application would be reduced to 1) design of system configuration (i.e., selection of desired objects), and 2) verification of configuration object files processed by the VE 102. Software design changes are primarily accomplished via changes to configuration objects—there are no VE code changes thereby reducing software integration and maintenance cost.

Thus, the architecture consistent with the present invention allows handling of dynamic display objects and their attributes, and makes the data objects and the VE 102 building blocks of a larger integrated system, allowing data objects to be driven by external events (such as a user command) or change based on a timing profile (such as cyclic updates). This dynamic capability is an asset in the embedded system.

The actual implementation of the present invention can be performed using existing technologies. That is, implementation does not require an innovation.

With respect to FIGS. 1 and 2, the methods and systems consistent with the display application technology architecture of the present invention will now be described.

Figure 1:
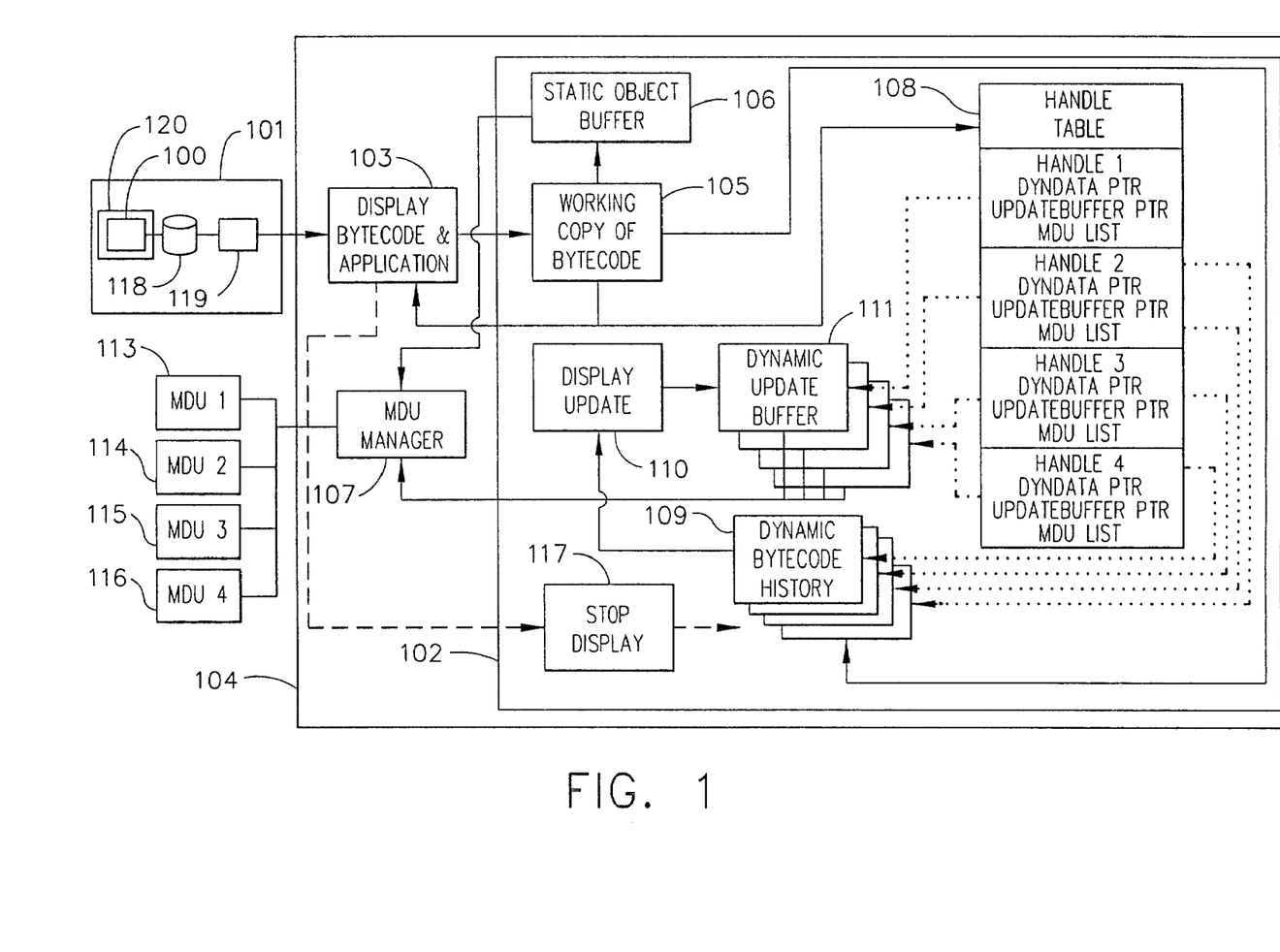
FIG. 1 is a flowchart showing an overview of one embodiment of the architecture consistent with the methods and systems of the present invention.
Figure 2:
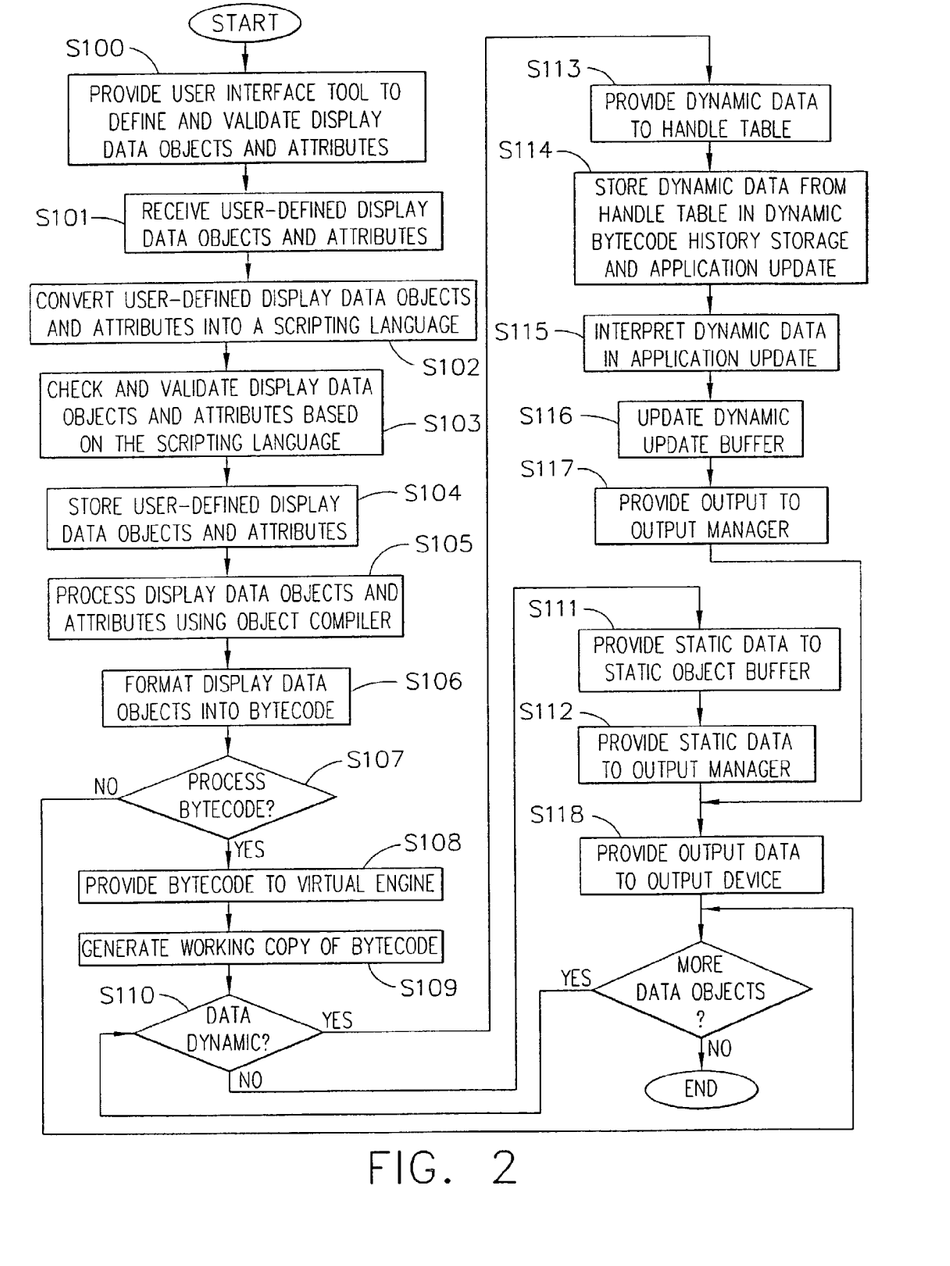
FIG. 2 is a flowchart showing the operational steps in one embodiment of the methods and systems consistent with the present invention.

As shown in FIG. 1, the architecture consistent with the present invention, includes a set of support tools, shown as the User Interface Tool 100 which runs in memory 120 on, for example, a data processing system such as a personal computer (PC) 101, which allows end-users and system designers/analysts to interact with the VE 102 to rapidly design, modify, and/or test and validate the display application software.

In particular, the User Interface Tool 100 is provided for the user or system designer, in step S100, to define the menu-driven display software objects and data (that is, the system and domain specific data) which the user can easily manipulate. The user can create, save, load, and edit object definition files utilizing the User Interface Tool 100.

The display data objects are required to be defined in a specific format and syntax, and can be defined as either static or dynamic objects. Each of the objects can have a number of both static and dynamic attributes that further define the object, and which are defined by the user. For example, display objects can be a line, circle, ellipse, rectangle, polygon, text, numeric readout, tape, bar, ADI (Attitude Directive Indicator), HIS (Horizontal Situation Indicator), filled dial, or world map. (ADI and HIS are examples of complex or group objects that are collections of a number of simpler display objects, treated as single entities.) Object attributes include, for example, height, width, color, text, size, position, minimum value, maximum value, current value, sign enable, rotation, group ID, object caption, line patterns, or digit formatting. Each object maintains a static copy of its original attribute data, a dynamic copy, and storage for computational data, and reference to any unique error handling.

Once the display data objects are defined and received by the User Interface Tool 100 in step S101, the User Interface Tool 100 allows the user to immediately test the resulting display application software on the target (without any need for embedded software programming, software compilation, linking, software loading, etc.) to validate the format and completeness of the display objects.

The User Interface Tool 100 provides access to other elements of the system, such as 1) the compiler 119, target loading and interface maps, 2) engine activation, access to external interfaces for simulation and testing, and 3) application development and debugging, and document support.

In particular, the User Interface Tool 100 converts the visual representation and object definitions created by the user to a scripting language in step S102, and submits this script to the object compiler 119. The compiler 119 can be embedded within the User Interface Tool 100, or can be used by the user in association with the User Interface Tool 100. In either case, the compiler 119 resides and is executed on the PC 101.

The compiler 119 checks and validates display object and object attributes definitions based on this scripting language in step S103. Each object maintains a static copy of its original attribute data, a dynamic copy, and storage for computational data, and reference to any unique error handling. In particular, the compiler 119, which maintains a master list of all objects and attributes, associates objects and their attributes with memory addresses from a user-supplied "load map" (i.e., a list that specifies the source of external inputs or outputs for an application).

Scripting is used to access target memory and to modify or manipulate each object attribute by direct target memory reference or through more complex mechanisms. For example, scripts are used to change the color or radius of a circle when the value at a referenced target memory location reaches a particular value. This is considered consistent usage, but using scripts to perform computation to derive limits from external data sources, for example, is an inconsistent usage.

The scripts are comprised of distinct "sections" that include lexical and syntax information. Examples of sections are: static text, and dynamic graphical objects. Scripting is simple by design and is not intended to be a general purpose programming language.

Using the User Interface Tool 100, the display data objects and attributes are saved in a database 118 at the PC 101 (or at a remote server) for further processing in step S104. This database 118 uses a display domain-specific syntax defined for each kind of database record, and its content can be reviewed and modified by the user.

The display files include scripts that describe in human readable format how a collection of objects will appear and be animated on the display. As stated above, this information is then processed by the object compiler 119 in step S105, which uses the script and optimizes object information, checks for consistency, grammar, lexical and semantic errors, and then formats or transforms the human readable format of the display data objects to a context free, optimized set of low level primitive instructions (the Bytecode) in step S106, which are matched to the capabilities of the VE 102 in an effort to minimize target processor utilization.

Thus, the "Bytecode" is produced by the compiler 119 and provided to the Application 104 for processing (interpretation) by the VE 102 in steps S107 and S108. The Application 104 runs in memory and includes the Display Bytecode and Application 103 and the VE 102. The Display Bytecode and Application 103 can reside and be executed in two general types of computer configurations: 1) on the host computer (PC 101) where local testing and validation of the application software can take place, or 2) on a target computer that is part of an operational system, such as an airplane, car, or computer used in a bank. In the target configuration case, the Bytecode can be sent to the VE 102 on the operational system (in one embodiment, over a network using TCP/IP, for example). Then the Bytecode is matched to the capabilities of the VE 102 (in this case) for processing and interpreting them, regardless of which computer configuration (host or target) is being used. The user can access and analyze/correct errors generated by the compiler 119 on the PC 101.

The Bytecode is a collection of display data objects and their attributes that provide all the information needed by the VE 102 to produce the desired display functionality and products intended for the application software. Further, the Bytecode is a binary compilation of the information that is understood by the Display VE 102. To elaborate, the VE 102 itself is a compilation of the underlying machine instructions (hence code). In contrast, the Bytecode is a compilation of the "instructions" for the VE 102. The underlying computing machine (i.e., computer) does not execute the Bytecode directly. Hence the Bytecode is treated by the computer as data. The Application 104 manages the Bytecode.

The intent of the VE 102 is to support the display and update the graphics objects based upon the compiler-produced Bytecode and the contents of the computer memory. As stated above, the VE 102 processes (interprets) object information based on a set of rules, and the static and dynamic attributes of the objects. The VE 102 reads addresses from object definitions for objects and attributes linked to external variables, and performs logical and arithmetic operations on objects/attributes. For example, the VE 102 performs cyclic computational updates based upon user inputs and object attributes. The VE 102 manages changes to the dynamic attributes of the objects and updates the attributes. However, objects are only updated when their associated data changes. Thus, the VE 102 is fully deterministic and verifiable.

The VE 102 interprets the compiler code in units of objects. Each object is "selected" for interpretation based upon object internal criteria (derived from end-user inputs). Objects without criteria (i.e., no target memory references) are interpreted once and are skipped thereafter. Other objects are interpreted based upon a change in their referenced target memory values and/or because a timing event has occurred (for example, a cyclic execution rate). Interpreted objects may result in a data transfer to external elements. If objects contain scripts, then the VE 102 passes control to such scripts, and the scripts execute not in target machine code units, but in VE primitive execution units. VE primitive execution units are designed to operate as a stack-based machine. Execution allows standard mathematical operators, logical operators, comparison operators, conditional branch operators, and target memory referencing operators (no loop or trigonometric operations).

The VE 102 encapsulates (separates, hides—not visible to or shared across data objects) each object and as a result, localizes possible computational and display errors. Thus, a problem associated with the display of an object cannot corrupt the display of any other object, improving liability.

The VE 102 does not contain any tasking capabilities, memory management capabilities or hardware specific interfaces with external devices. The target machine environment executes the VE 102 at a rate designed for the display application. The VE 102 assumes a simple rate monolithic scheduler, but could also be designed for use with a more complex scheduler (such as foreground/background). Since the Bytecode includes both dynamic and static objects (or data) elements, and the dynamic elements change, preferably a Working Copy 105 of the Bytecode can be generated in step S109, within the direct control by the VE 102 for convenient management and updates.

The program determines if the data is dynamic in step S110, and if not, provides the static data to the Static Object Buffer in step S111. The Static Object Buffer 106, within the VE 102, is a data storage for storing the static data of the Bytecode, and making it available to the Multi-function Display Unit (MDU) Manager 107 in step S112. Examples of the static display data are the display skeleton and frame, and all display elements that remain unchanged for a particular display page.

If the program determines the data to be dynamic in step S110, the dynamic data of the Bytecode from the Working Copy 105 is provided to the Handle Table 108 in the VE 102 in step S113 for handling by the Handle Table 108, which is intended to allow the VE 102 to manage multiple sets of dynamic data. The Handle Table 108 includes information about where each data set is stored (data pointers) and the list of the actual output data.

The dynamic data from the Handle Table is stored in the Dynamic Bytecode History 109 of the VE 102 in step S114, which is a storage for such dynamic data from the Handle Table 108, in case of errors and recovery from erroneous situations, and/or if there is a need for access to the past data. In that event, the Dynamic Bytecode History 109 will update the Display Update 110 (described below).

The Display Update 110 is a main processing engine of the Display VE 102. The Display Update 110 interprets the display data and updates the Dynamic Update Buffer 111 accordingly in step S115.

The Dynamic Update Buffer 111 is a set of data storage for the dynamic data used by the VE 102, which receives the dynamic data from the Handle Table 108 for updates in step S116. Use of this "separate" storage prevents incorrect usage or access of the dynamic data while such data is still being updated in the Handle Table 108.

The Display Update 110 cyclically generates outputs (for example at 12.5 Hz) that represent information provided in the Bytecode. For example, the Bytecode 103 indicates that if data item X exceeds data item Y, then data item Z must be provided to the MDU Manager 107 for sending to the output device 115 (or 113, 114, or 116) in step S117. This element of the VE 102 is executed by the computer cyclically, to generate the desired outputs periodically.

The Multi-function Display Unit (MDU) Manager 107 interfaces with the desired Multi-function Display Units (MDUs) 113–116 that are the output devices, and provides them the final data in step S118. The MDU Manager 107 is provided with exact format and characteristics of the MDUs (in this example, output devices 113–116).

Finally, the Stop Application 117 allows the user to stop the execution of a single display by the VE 102 and all outputs to the MDU Manager 107, which then deletes the Handle Table and Buffers.

Thus, the methods and system consistent with the present invention include an architecture (supported by a User Interface Tool) that allows a system user or designer to define, test, and validate the display data objects for his/her unique system, integrate them with the re-usable VE, and generate the display application software without the need for programming. Once the initial definition and validation is complete, the system can proceed to formal verification, certification, and operation of the display application. The VE (code) only needs to be verified/certified for the first system. After that, verification/certification tasks for subsequent configurations of such a system, or other systems that need display application, would be reduced to data (and not code) verification and certification since the VE (code) part would be unchanged, greatly reducing the cost and schedule for display systems.

Thus, methods and systems consistent with the present invention automate the generation of embedded software display applications beyond automatic generation of code, and greatly simplify their maintenance.

Further, the present invention can be implemented on different computer platforms (processors), and implemented in different languages (such as Ada and C++). Thus, significant reduction in cost and schedule can be achieved during definition, validation, production and maintenance of the embedded display application software.

The performance of the design architecture is acceptable for display application domains, and can be used for rapid development (in a matter of minutes) of embedded display software in many systems, including but not limited to, air, ground, and space transportation systems, real-time systems, communication systems, military systems, commercial and industrial systems, ground control, maintenance, and support facilities, and test and simulation facilities, and the like.

One of ordinary skill in the art would appreciate that the above-described embodiments of the invention are merely possible examples of implementations which are set forth for a clear understanding of the principles of the invention. For example, one of ordinary skill in the art would appreciate that methods, systems, and articles of manufacture consistent with the present invention may also be implemented in a client-server environment. In that case, a client computer system and server computer system are each connected to a network, such as a Local Area Network, Wide Area Network, or the Internet. Some or all of the code or data can be stored on either the client or the server computer system, and some or all of the steps of the processes can be carried out on the server computer system, which is accessed by the client computer system over the network.

Further, although aspects of one implementation are depicted as being stored in memory, one of ordinary skill in the art would appreciate that all or part of the systems and method consistent with the present invention may be stored on or read from other computer-readable media, such as secondary storage devices, like hard disks, floppy disks, and CD-ROM; a carrier wave received from a network such as the Internet; or other forms of ROM or RAM. Further, one of ordinary skill in the art would appreciate that a generic embedded application technology architecture suitable for use with methods, systems, and articles of manufacture consistent with the present invention may contain additional or different components.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method of creating a display application, the method comprising:
   receiving a set of user-defined display data objects and attributes of said display data objects, the data objects and attributes being specific to the display application, the display application created using a user interface tool;
   formatting said display data objects into a Bytecode that defines components and attributes of the display application;
   providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and
   generating an output, via said Virtual Engine, that represents information, functionality and behavior of the display application provided in said Bytecode.

2. The method according to claim 1 wherein said Virtual Engine is reusable.

3. The method according to claim 1 further comprising providing a user interface tool with which to define and validate the display data objects and attributes of said display data objects.

4. The method according to claim 3 wherein said user interface tool is provided on a data processing system.

5. The method according to claim 4 further comprising converting said user-defined display data objects and said attributes of said display data objects into a scripting language.

6. The method according to claim 5 further comprising checking and validating said display data objects and said attributes of said display data objects based on said scripting language.

7. The method according to claim 6 wherein said scripting language is comprised of distinct sections that include lexical and syntax information.

8. The method according to claim 7 wherein said sections include static text and dynamic graphical objects.

9. The method according to claim 1 wherein said Virtual Engine is verified/certified for a first display application only.

10. The method according to claim 1 wherein said display data objects are defined as at least one of static and dynamic objects.

11. The method according to claim 1 wherein said display data objects are defined in a specific format and syntax.

12. The method according to claim 1 wherein said display data objects are menu-driven.

13. The method according to claim 1 wherein said display data objects include lines, circles, ellipses, rectangles, polygons, text, numeric readouts, tapes, bars, ADI, HIS, filled dials, and world maps.

14. The method according to claim 1 wherein said attributes of said display data objects include height, width, color, text, size, position, minimum value, maximum value, current value, sign enable, rotation, group ID, object caption, line patterns, and digit formatting.

15. The method according to claim 1 wherein said display data objects maintain a static copy of original attribute data, a dynamic copy, a storage for computational data, and reference to any unique error handling.

16. The method according to claim 1 wherein each of said display data objects is encapsulated.

17. The method according to claim 1 further comprising storing said set of user-defined display data objects and attributes of said display data objects in a memory.

18. The method according to claim 17 further comprising processing said display data objects stored in said memory using an object compiler.

19. The method according to claim 18 wherein said formatting step is performed by said object compiler to produce said Bytecode.

20. The method according to claim 19 further comprising displaying the Bytecode and executing the display application on one of a host computer where local testing and validation of the application software can take place, and a target computer that is part of an operating system.

21. The method according to claim 18 wherein said object compiler is embedded within the user interface tool.

22. The method according to claim 18 wherein said object compiler resides and is executed on a data processing system.

23. The method according to claim 18 wherein said object compiler maintains a master list of all said display data objects and said attributes of said display data objects.

24. The method according to claim 1 further comprising generating, using said Virtual Engine, a Working Copy of said Bytecode for management and updates.

25. The method according to claim 1 further comprising storing static data of said Bytecode in a Static Object Buffer.

26. The method according to claim 1, wherein the Virtual Engine has a Dynamic Bytecode History storage and the method further comprises storing dynamic data from said location identified by one of the pointers in said Handle Table to said Dynamic Bytecode History storage for error recovery.

27. The method according to claim 1, wherein the Virtual Engine has a Dynamic Update Buffer and the method further comprises storing dynamic data from said location identified by one of the pointers in said Handle Table to said Dynamic Update Buffer to prevent one of incorrect usage and access of said dynamic data during updating by said Handle Table.

28. The method according to claim 27 further comprising interpreting said dynamic data and updating said Dynamic Update Buffer accordingly.

29. The method according to claim 28 wherein said interpreting and updating step is performed cyclically to generate desired outputs periodically.

30. The method according to claim 1 wherein said generating step is performed by a Display Update.

31. The method according to claim 1 further comprising providing said output to an Output Manager which provides at least one display unit with final data.

32. The method according to claim 31 wherein said Output Manager is provided with exact format and characteristics of said at least one display unit.

33. The method according to claim 31 further comprising stopping execution of said Virtual Engine and all said output to said Output Manager to stop a display.

34. The method according to claim 1 further comprising testing and validating said user-defined data objects.

35. The method according to claim 1 further comprising interpreting said Bytecode in units of objects selected for interpretation based upon display object internal criteria.

36. A method of creating a display application, the method comprising:
   receiving a set of user-defined display data objects and attributes specific to the display application, the display application created using a user interface tool;
   transforming said user-defined display data objects into a Bytecode which provides information needed by a Virtual Engine to produce functionality and products intended for the display application;
   storing static data of said Bytecode in a Static Object Buffer and making the Static Object Buffer available to an Output Manager;
   managing multiple sets of dynamic data of said Bytecode via Handle Table which includes information about where each dynamic data set is stored and a list of actual output data;
   storing dynamic data in a Dynamic Update Buffer to prevent one of incorrect usage and access of said dynamic data while said dynamic data is still being updated via said Handle Table;
   interpreting said dynamic data and updating said Dynamic Update Buffer with said interpreted data; and
   generating output from said Dynamic Update Buffer to said Output Manager that represents information provided in said Bytecode.

37. A system for creating a display application, the system comprising:
   means for receiving a set of user-defined display data objects and attributes of said display data objects specific to the display application, the display application created using a user interface tool;
   means for formatting said display data objects into a Bytecode that defines components and attributes of the display application;
   means for providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and
   means for generating an output, via said Virtual Engine, that represents information, functionality and behavior of the display application provided in said Bytecode.

38. A system for creating a display application, the system comprising:
   means for receiving a set of user-defined display data objects and attributes specific to the display application, the display application created using a user interface tool;
   means for transforming said user-defined display data objects into a Bytecode which provides functionality and products intended for the display application needed by a Virtual Engine to produce the display application;
   means for storing static data of said Bytecode in a Static Object Buffer and making the Static Object Buffer available to an Output Manager;
   means for managing multiple sets of dynamic data of said Bytecode via a Handle Table which includes information about where each dynamic data set is stored and a list of actual output data;
   means for storing dynamic data in a Dynamic Update Buffer to prevent one of incorrect usage and access of said dynamic data while said dynamic data is still being updated via said Handle Table;
   means for interpreting said dynamic data and updating said Dynamic Update Buffer with said interpreted data; and
   means for generating output to said Output Manager from said Dynamic Update Buffer that represents information provided in said Bytecode.

39. The system according to claim 38 further comprising means for generating a Working Copy of said Bytecode from which said static data and said dynamic data are obtained.

40. The system according to claim 38 further comprising means for stopping execution of said Virtual Engine and all said output to said Output Manager to stop a display.

41. A computer-implemented apparatus for creating a display application, the apparatus comprising a computer having:
- a user interface tool which creates display data objects and attributes of said display data objects specific to the display application;
- an object compiler which formats said display data objects and said attributes into a Bytecode;
- a Virtual Engine which interprets said Bytecode to produce a predetermined functionality and products intended for the display application, said Virtual Engine having a Handle Table derived from said Bytecode, said Handle Table including a plurality of pointers, each pointer identifying a respective location for storing dynamic data associated with a corresponding one of the data objects; and
- an output generator which generates an output, via said Virtual Engine, that represents information, functionality and products of the display application provided in said Bytecode.

42. The apparatus according to claim 41 wherein said object compiler is embedded within the user interface tool.

43. The apparatus according to claim 42 wherein said object compiler resides and is executed on a data processing system.

44. The apparatus according to claim 41 wherein said object compiler maintains a master list of all said display data object and said attributes of said display data objects.

45. The apparatus according to claim 41 further comprising means for generating a Working Copy of said Bytecode.

46. The apparatus according to claim 45 further comprising a Static Object Buffer which stores static data from said Working Copy of said Bytecode.

47. The apparatus according to claim 41 further comprising a Dynamic Update Buffer which stores dynamic data to prevent one of incorrect usage and access of said dynamic data while said dynamic data is still being updated via said Handle Table.

48. The apparatus according to claim 47 further comprising a Display Update which interprets said dynamic data and updates said Dynamic Update Buffer with said interpreted data.

49. The apparatus according to claim 48 further comprising an Output Manager which provides final data to at least one display unit from said Dynamic Update Buffer.

50. The apparatus according to claim 47 further comprising a Dynamic Bytecode History storage which stores said dynamic data from said location identified by one of the pointers in said Handle Table for error recovery.

51. The apparatus according to claim 41 wherein said Virtual Engine is reusable.

52. The apparatus according to claim 41 wherein said Virtual Engine is only verified/certified for a first system application.

53. The apparatus according to claim 41 wherein said user interface tool is provided on a personal computer.

54. The apparatus according to claim 41 wherein said display data objects are defined as at least one of static and dynamic.

55. The apparatus according to claim 41 wherein said display data objects are defined in a specific format and syntax.

56. The apparatus according to claim 41 wherein each of said display data objects is encapsulated.

57. The apparatus according to claim 41 wherein said user-defined display data objects and said attributes of said display data objects are converted into a scripting language.

58. The apparatus according to claim 41 wherein said display data objects are menu-driven.

59. The apparatus according to claim 41 wherein said display data objects include lines, circles, ellipses, rectangles, polygons, text, numeric readouts, tapes, bars, ADI, HIS, filled dials, and world maps.

60. The apparatus according to claim 41 wherein said attributes of said display data objects include height, width, color, text, size, position, minimum value, maximum value, current value, sign enable, rotation, group ID, object caption, line patterns, and digit formatting.

61. The apparatus according to claim 41 wherein said display data objects maintain a static copy of original attribute data, a dynamic copy, a storage for computational data, and reference to any unique error handling.

62. The apparatus according to claim 41 wherein said display data objects and said attributes of said display data objects are checked and validated based on said scripting language.

63. The apparatus according to claim 62 wherein said scripting language comprises distinct sections that include lexical and syntax information.

64. The apparatus according to claim 63 wherein said sections include static text and dynamic graphical objects.

65. The apparatus according to claim 41 wherein said Bytecode of the display application is displayed and executed on one of a host computer where local testing and validation of the application software can take place, and a target computer that is part of an operational system.

66. The apparatus of claim 41 further comprising a database in which said user interface tool stores said display data objects and attributes.

67. The apparatus according to claim 41 wherein said Bytecode is interpreted in units of objects selected for interpretation based upon display object internal criteria.

68. A tangible computer-readable medium having contents that cause a computer system to create a display application, the contents containing a software program that performs the steps of:
- receiving a set of user-defined display data objects and attributes of said display data objects specific to the display application, the display application created using a user interface tool;
- formatting said display data objects into a Bytecode that defines components and attributes of the display application;
- providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and
- generating an output, via said Virtual Engine, that represents information, functionality and products of the display application provided in said Bytecode.

69. A tangible computer-readable medium having contents that cause a computer system to create a display application, the contents containing a software program that performs the steps of:
- receiving a set of user-defined display data objects and attributes specific to the display application created using a user interface tool;
- transforming said user-defined display data objects into a Bytecode which provides information needed by a Virtual Engine to produce a predetermined functionality and products intended for the display application;

storing static data of said Bytecode in a Static Object Buffer and making the Static Object Buffer available to an Output Manager;

managing multiple sets of dynamic data of said Bytecode a Handle Table which includes information about where each dynamic data set is stored and a list of actual output data;

storing dynamic data in a Dynamic Update Buffer to prevent one of incorrect usage and access of said dynamic data while said dynamic data is still being updated via said Handle Table;

interpreting said dynamic data and updating said Dynamic Update Buffer with said interpreted data; and generating output to said Output Manager from said Dynamic Update Buffer that represents information provided in said Bytecode.

70. A computer system for creating a display application, the computer system comprising:

a memory including at least one program for receiving a set of user-defined display data objects and attributes of said display data objects specific to the display application, the display application created using a user interface tool; formatting said display data objects into a Bytecode that defines components and attributes of the display application; providing said Bytecode to a Virtual Engine, said Virtual Engine having a Handle Table derived from said Bytecode, said Handle Table including a plurality of pointers, each pointer identifying a respective location for storing dynamic data associated with a corresponding one of the data objects; and generating an output that represents information, functionality and products of the display application provided in said Bytecode; and a processor for running said program to generate said output, via said Virtual Engine.

* * * * *